(12) United States Patent
Olson

(10) Patent No.: US 9,799,151 B2
(45) Date of Patent: Oct. 24, 2017

(54) AIRCRAFT FUEL SHUTOFF INTERLOCK

(71) Applicant: Carolyn J. Olson, Savannah, GA (US)

(72) Inventor: Carolyn J. Olson, Savannah, GA (US)

( * ) Notice: Subject to any disclaimer, the term of this patent is extended or adjusted under 35 U.S.C. 154(b) by 0 days.

(21) Appl. No.: 15/140,278

(22) Filed: Apr. 27, 2016

(65) Prior Publication Data
US 2016/0318620 A1    Nov. 3, 2016

Related U.S. Application Data

(60) Provisional application No. 62/155,806, filed on May 1, 2015.

(51) Int. Cl.
| | | |
|---|---|---|
| *G07C 5/08* | (2006.01) | |
| *B64D 31/06* | (2006.01) | |
| *F02C 9/46* | (2006.01) | |
| *F01D 21/14* | (2006.01) | |

(52) U.S. Cl.
CPC ........... *G07C 5/0808* (2013.01); *B64D 31/06* (2013.01); *F01D 21/14* (2013.01); *F02C 9/46* (2013.01)

(58) Field of Classification Search
CPC ......... G07C 5/0808; F01D 21/14; F02C 9/46; B64D 31/06
See application file for complete search history.

(56) References Cited

U.S. PATENT DOCUMENTS

| | | | | |
|---|---|---|---|---|
| 3,124,072 | A * | 3/1964 | Hermann | F41G 7/2233 102/348 |
| 3,164,340 | A * | 1/1965 | Slater | G01C 21/16 244/175 |
| 3,168,105 | A * | 2/1965 | Cisco | G05D 9/02 137/386 |
| 3,179,355 | A * | 4/1965 | Pickering | F41G 7/30 244/190 |
| 3,360,218 | A * | 12/1967 | Miller | B64C 3/58 244/12.5 |
| 3,509,942 | A * | 5/1970 | Lindberg | A62C 3/08 137/67 |
| 5,381,742 | A * | 1/1995 | Linton | F23G 5/12 110/235 |
| 5,555,720 | A * | 9/1996 | Wernberg | F02C 9/46 60/773 |
| 6,394,392 | B1* | 5/2002 | Lafferty | B64C 1/10 244/117 R |
| 9,346,662 | B2* | 5/2016 | Van Vliet | B67D 7/04 |

(Continued)

FOREIGN PATENT DOCUMENTS

| | | | | | |
|---|---|---|---|---|---|
| GB | | 746903 A | * | 3/1956 | ............ B64D 31/00 |
| GB | | 934124 A | * | 8/1963 | ............ F02K 1/16 |

(Continued)

*Primary Examiner* — Rodney Butler
(74) *Attorney, Agent, or Firm* — John G. Posa; Belzer PC

(57) ABSTRACT

A system for hindering the pilot from inadvertently turning off the fuel and/or engine when it is not safe is disclosed. In an embodiment, a fuel shutoff interlock is engaged if the aircraft is in the air and cross-side engine is not running. In an embodiment, a fuel shutoff interlock is not engaged if essential bus power is not present. In an embodiment, a fuel shutoff interlock is not engaged if the aircraft is on the ground. In an embodiment, a fuel shutoff interlock is not engaged if the cross-side engine is running.

16 Claims, 9 Drawing Sheets

(56) References Cited

U.S. PATENT DOCUMENTS

| | | | | |
|---|---|---|---|---|
| 2008/0173763 | A1* | 7/2008 | Morgia | B64D 37/26 244/135 R |
| 2009/0045295 | A1 | 2/2009 | Lundgren | B64C 29/0033 244/7 C |
| 2010/0256839 | A1* | 10/2010 | Fitzpatrick | B64C 39/024 701/8 |
| 2011/0284649 | A1* | 11/2011 | Crawford | A01G 15/00 239/2.1 |
| 2013/0207797 | A1* | 8/2013 | Shimazu | E02F 9/2025 340/441 |
| 2015/0060092 | A1* | 3/2015 | Kho | A62C 35/58 169/44 |

FOREIGN PATENT DOCUMENTS

| | | | | |
|---|---|---|---|---|
| GB | 938605 A | * | 10/1963 | B64C 27/32 |
| JP | 2010096017 A | * | 4/2010 | Y02T 10/48 |

* cited by examiner

AIRCRAFT FUEL SHUTOFF INTERLOCK

CROSS-REFERENCE TO RELATED APPLICATIONS

This application claims priority benefit of U.S. Provisional Patent Application No. 62/155,806, entitled "AIRCRAFT FUEL SHUTOFF INTERLOCK," filed on May 1, 2015, by Carolyn J. Olson, which is incorporated herein by reference.

FIELD

This specification relates generally to the safety of airplanes.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

On occasion airplanes mishaps occur due to pilot error, which may lead to crashes and loss of life. This specification recognizes that it is possible for the pilot to accidentally shut off an engine at an inappropriate time, which could cause a crash. Ever since the advent of multi-engine aircraft, there have been numerous documented cases of engine failures where pilots have inadvertently shut down the wrong engine, or the remaining good engine. Training in flight simulators has reduced the number of incidents of inadvertently shutting down the wrong engine, but there are still too many occurrences where pilots accidentally shut down the remaining good engine. Most notably in recent times is TransAsia Airways ATR 72-600, flight GE235 on Feb. 4, 2015. Arguably, the number one reason for this continued mistake could be due to panic, especially during takeoff when the aircraft is very low to the ground and maximum takeoff power is needed.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1 and 3A-6 is a brief description of each element. After the brief description of each element, each element is further discussed, usually in numerical order, but there is no one location where all of the information of any element of FIGS. 1 and 3A-6 is necessarily located. Unique information about any particular element or any other aspect of any of FIGS. 1-6 may be found in, or implied by, any part of the specification.

Figure 1:
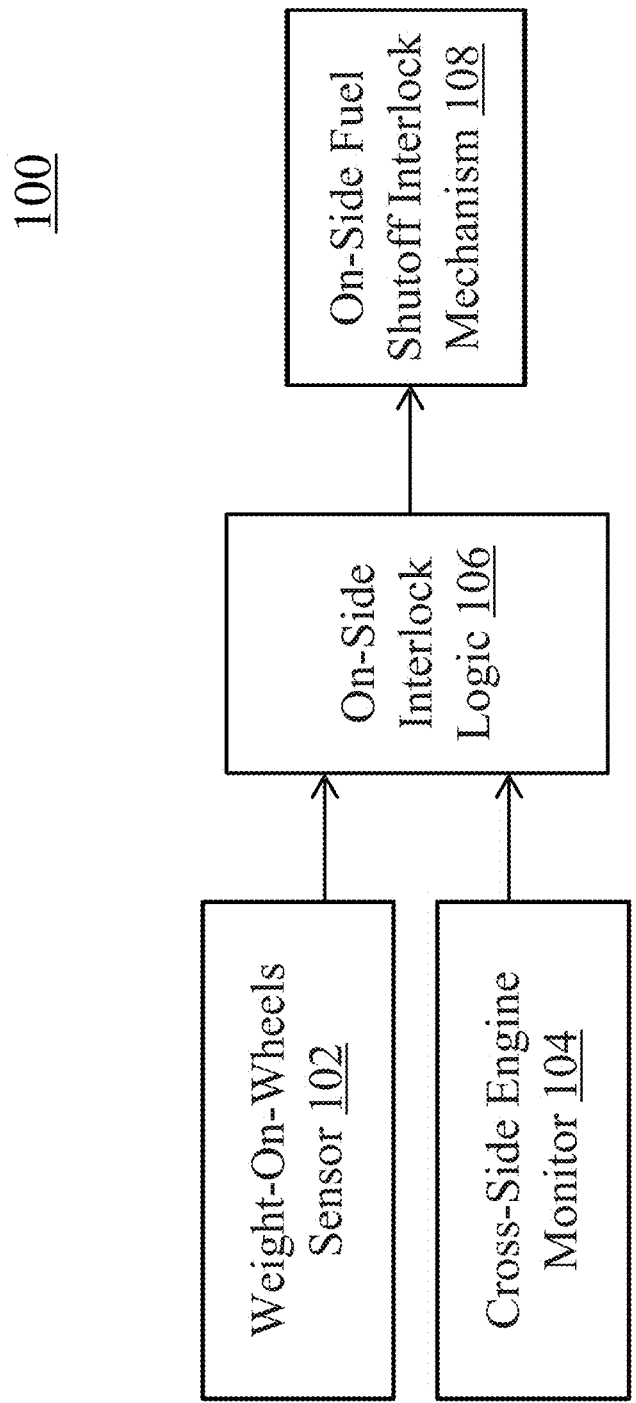
FIG. 1 shows a block diagram of an embodiment of a mechanism that includes a fuel safety control system of an airplane.

FIG. 1 shows a block diagram of an embodiment of a mechanism 100 that includes a fuel safety control system of an airplane. The mechanism 100 includes at least Weight-On-Wheels (WOW) logic 102, a cross-side engine monitor 104, on-side interlock logic 106, and an on-side interlock mechanism 108. In other embodiments, the mechanism 100 may not include all of the components listed and/or may include other components in addition to or instead of those listed above.

In at least one embodiment, the mechanism 100 includes a safety control system, which when installed on an airplane, would prevent the fuel of the airplane from being shutoff when conditions are detected in which shutting off the fuel is expected to be unsafe. For example, the mechanism 100 may prevent or at least hinder pilots from inadvertently shutting down the one remaining good engine in the case of an engine failure of the other engine. In at least one embodiment, the mechanism 100 includes at least an aircraft fuel shutoff interlock system that may be used in any multi-engine airplanes and multi-engine helicopters, for example. In an embodiment, FIG. 1 categorizes and groups together types of aircraft components that may be used in the aircraft fuel shutoff interlock system. For example, the aircraft fuel shutoff interlock system may utilize aircraft components that are found on the market. Throughout this specification, the terms "aircraft," "airplane," and "helicopter" are used interchangeably, and may be substituted one for another to obtain different embodiments.

Weight-on-wheels (WOW) logic 102 may include WOW signals received from sensors/monitoring devices, which indicates that a particular main gear strut is compressed by a specific amount, thus bearing a percentage of the weight of the aircraft (e.g., when the aircraft is on the ground). In an embodiment, the WOW sensor 102 sends signals to an on-side interlock logic that processes the signals and accordingly controls the on-side engine. Throughout the specification, the term "on-side" is used to specify the engine that is currently on. In an embodiment, the WOW signal may indicate that the aircraft is on the ground. If the WOW signal is not present and if the aircraft has electrical power, then the aircraft is assumed to be in flight (e.g., in the air).

Cross-side engine monitor 104 includes one or more monitoring devices that, when activated, monitor the status of the opposite engine and send signals to the on-side interlock logic. For example, the cross-side engine monitor 104 may indicate to the on-side interlock logic that the opposite engine has lost power (e.g., when the cross-side engine is off). Throughout this specification, the term "cross-side" refers to the side of the airplane that is opposite the current side (e.g., the on-side engine). For example, with respect to the on-side engine on a first side of the aircraft, the cross-side engine refers to the engine on the other side of the aircraft. In at least one embodiment, the cross-side engine monitor 104 is coupled to the control system of a first side of the airplane (e.g., on-side interlock logic), but monitors whether the engine on the other side of the airplane (e.g., cross-side engine) is on or off.

In at least one embodiment, the cross-side engine monitor 104 may include various monitoring devices that may provide various signals indicating various performance status of the cross-side engine. Because of the variation of the designs and components of different aircraft Original Equipment Manufacturers (OEMs), there are many possible designs for a safety mechanism preventing the pilot from shutting off the only engine that is currently on. In an embodiment, an aircraft engine's performance may be assessed by measuring the following parameters, which include, but are not limited to, (1) the angular velocity of the turbine of the engine compressor, and/or the angular velocity of the crankshaft for piston powered aircraft (either of which may be measured in the number of revolutions per unit of time, such as Revolutions Per Minute (RPM)); (2) the Engine Pressure Ratio (EPR); (3) the torque applied to turn the engine shaft or the compressor shaft; (4) the oil pressure of the engine; and (5) Fully Automated Digital Engine Control (FADEC) signals, which monitor and indicate an aircraft engine's immediate performance, for example. Any one of, combination of, or all of the aircraft performance indicators may be monitored by the cross-side engine monitor 104 to determine whether the cross-side engine is performing properly. The cross-side engine monitor 104 can also be specific to an engine being in a takeoff power mode. If the cross-side engine's power (and/or other performance parameters) drops below a specific power setting (or the other performance parameters cross a threshold), the cross-side engine monitor 104 sends signals to the on-side interlock logic indicating that takeoff power is not available on the cross-side engine (and therefore system 100 prevents or hinders the pilot from turning off the on-side engine).

On-side interlock logic 106 may be a logic circuit and/or a programmed processor that determines whether to allow the fuel to an engine to be shutoff and turned on freely or whether to inhibit the turning on or shutting off of the fuel at various times, based on the input signals received from WOW sensor 102 and/or the cross-side engine monitor 104. In an embodiment, the on-side interlock logic 106 includes a safety circuit that controls whether to allow the on-side engine to be turned off, such as by depriving the engine from fuel. In an embodiment, the on-side interlock logic 106 is configured to trigger an on-side fuel shutoff interlock mechanism based on a logical assessment of the WOW sensor 102 and/or cross-side engine monitor 104.

On-side fuel shutoff interlock mechanism 108 may include mechanisms that are used to control the fuel provided to the on-side engine(s) of the aircraft. In an embodiment, the on-side shutoff interlock mechanism 108 may include mechanical mechanisms (e.g., a mechanical relayed solenoid that controls a lever that controls a fuel valve), electrical mechanisms (e.g., an electrical switch that controls a fuel solenoid), or electronic mechanisms (e.g., a signal from an on-side Fully Automated Digital Engine Control (FADEC) to a fuel solenoid), for example. Throughout this specification, the terms "fuel solenoid," "fuel close solenoid," and "fuel control solenoid" are used interchangeably, and may be substituted one for another to obtain different embodiments. In other embodiments, other mechanisms may be used for the on-side fuel shutoff interlock mechanism. On-side fuel shutoff interlock mechanism 108 will be discussed further in conjunction with FIGS. 3A-5. Although there are many possibly other variations in aircraft OEM designs, the same or similar principles may apply to implementing the aircraft fuel shutoff interlock of this specification in other systems not expressly disclosed.

Although in this specification, reference is made to the cross-side engine and on-side engine, all engines may have the same type of fuel shutoff interlock mechanism and engine monitor(s). Each of the engines is monitored, and when one of the engines is not performing properly, if it is unsafe to shut off the other engines, the fuel shutoff interlock prevents or at least hinders the pilot from shutting off the other engines. Throughout this specification, the comments made about the cross-side engine and on-side fuel shutoff interlock apply to each engine being monitored and each engine currently on, respectively.

Figure 2:
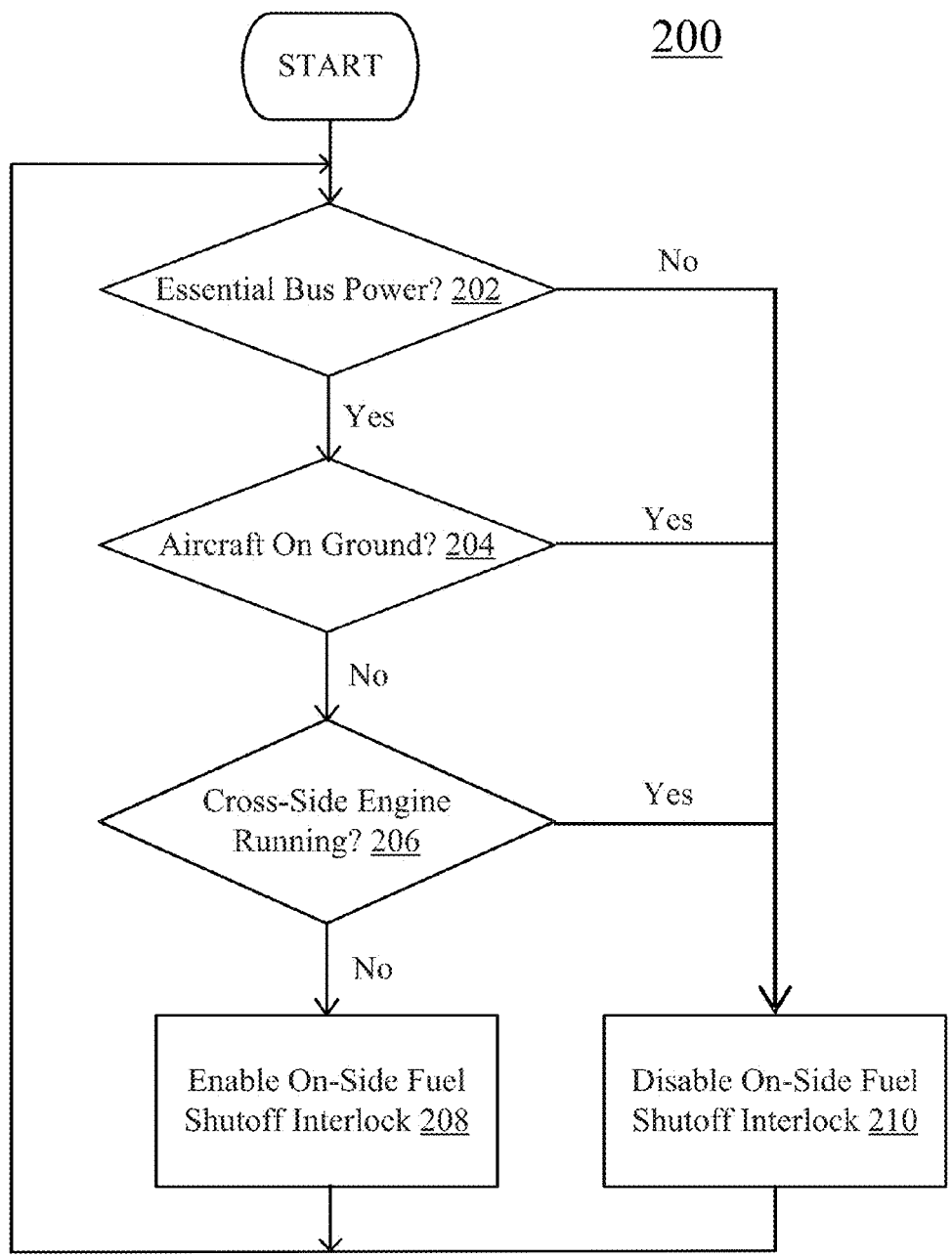
FIG. 2 shows a flowchart of an embodiment of a method of controlling whether to allow the fuel of an airplane to be shut off.

FIG. 2 shows a flowchart of an embodiment of a method 200 of controlling whether to allow the fuel of an airplane to be shut off.

In step 202, the on-side interlock logic 106 determines whether essential bus power exists. In at least one embodiment, the essential bus power is the power carried by the bus of the electrical system of the aircraft between the alternators and/or generators and the other electrical systems of the aircraft. In at least one embodiment, the essential bus power is sufficient to power the systems of the aircraft that are essential for the aircraft to fly safely. If no essential bus power is detected, the system would be inoperative without essential bus power unless a dedicated backup battery were incorporated into the aircraft, and the method 200 proceeds to step 210, in which the on-side fuel shutoff interlock (e.g., the on-side interlock mechanism 108) is disabled, allowing the pilot to shut off the fuel provided to the on-side engine. If essential bus power is determined to exist, the method 200 proceeds to step 204.

In step 204, the on-side interlock logic 106 determines whether the aircraft is on the ground or in the air. As part of the step 204, the on-side interlock logic 106 receives a signal(s) from the WOW sensor 102 and determines whether the aircraft is firmly on the ground (e.g., when the gear strut is compressed) or in the air (e.g., when the gear strut is not compressed). In other words, if the weight on the wheels is above a certain threshold, the airplane is assumed to be on the ground and not in takeoff mode, whereas if the plane has some weight on the wheels, but not an amount greater than a certain threshold, the plane may still be on the ground, but in takeoff mode. If the aircraft is determined to be firmly on the ground, it is considered safe to shut off the fuel, and thus the method 200 proceeds to step 210. If the aircraft is determined to be in the air (or in the takeoff mode), the method 200 proceeds to step 206.

In step 206, the on-side interlock logic 106 determines whether the cross-side engine is running (or during takeoff, checks for maximum takeoff power, which is the maximum power the airplane is capable of outputting and/or the power required for takeoff). As part of the step 204, the on-side interlock logic 106 receives a signal(s) from the cross-side engine monitor 104 and determines the status/performance of the cross-side engine. If it is determined that the cross-side engine is performing as expected, the method 200 proceeds to step 210. Otherwise, if the cross-side engine is NOT performing as expected, the method 200 proceeds to step 208.

In step 208, since the cross-side engine is not performing as expected, the on-side fuel shutoff interlock (e.g., the on-side fuel shutoff interlock mechanism 108) for the on-side engine is enabled, thus preventing the pilot from inadvertently shutting off the fuel to the on-side engine.

In step 210, since the cross-side engine is performing as expected, the on-side fuel shutoff interlock for the on-side engine is disabled, thus allowing the pilot to shut off the fuel to the on-side engine.

In an embodiment, when the essential bus power exists and the aircraft is in the air, the on-side interlock logic 106 continually checks whether the cross-side engine is operating properly to determine whether to enable or disable the on-side fuel shutoff interlock. For example, if the cross-engine is off or not operating properly, the on-side interlock logic 106 would enable/engage the on-side fuel shutoff interlock to prevent the pilot from shutting off the fuel to the on-side engine. If the cross-side engine regains expected power, the on-side interlock logic 106 would disable the on-side fuel shutoff interlock, allowing the on-side engine to be shut down by the pilot. In at least one embodiment, pilots would be hindered (e.g., prevented) from, and therefore less likely to, inadvertently shut off the fuel to the engine, thereby improving the safety of the airplane.

In an embodiment, each of the steps of method 200 is a distinct step. In at least one embodiment, although depicted as distinct steps in FIG. 2, steps 202-210 may not be distinct steps. In other embodiments, method 200 may not have all of the above steps and/or may have other steps in addition to or instead of those listed above. The steps of method 200 may be performed in another order. Subsets of the steps listed above as part of method 200 may be used to form their own method.

Figure 3A:
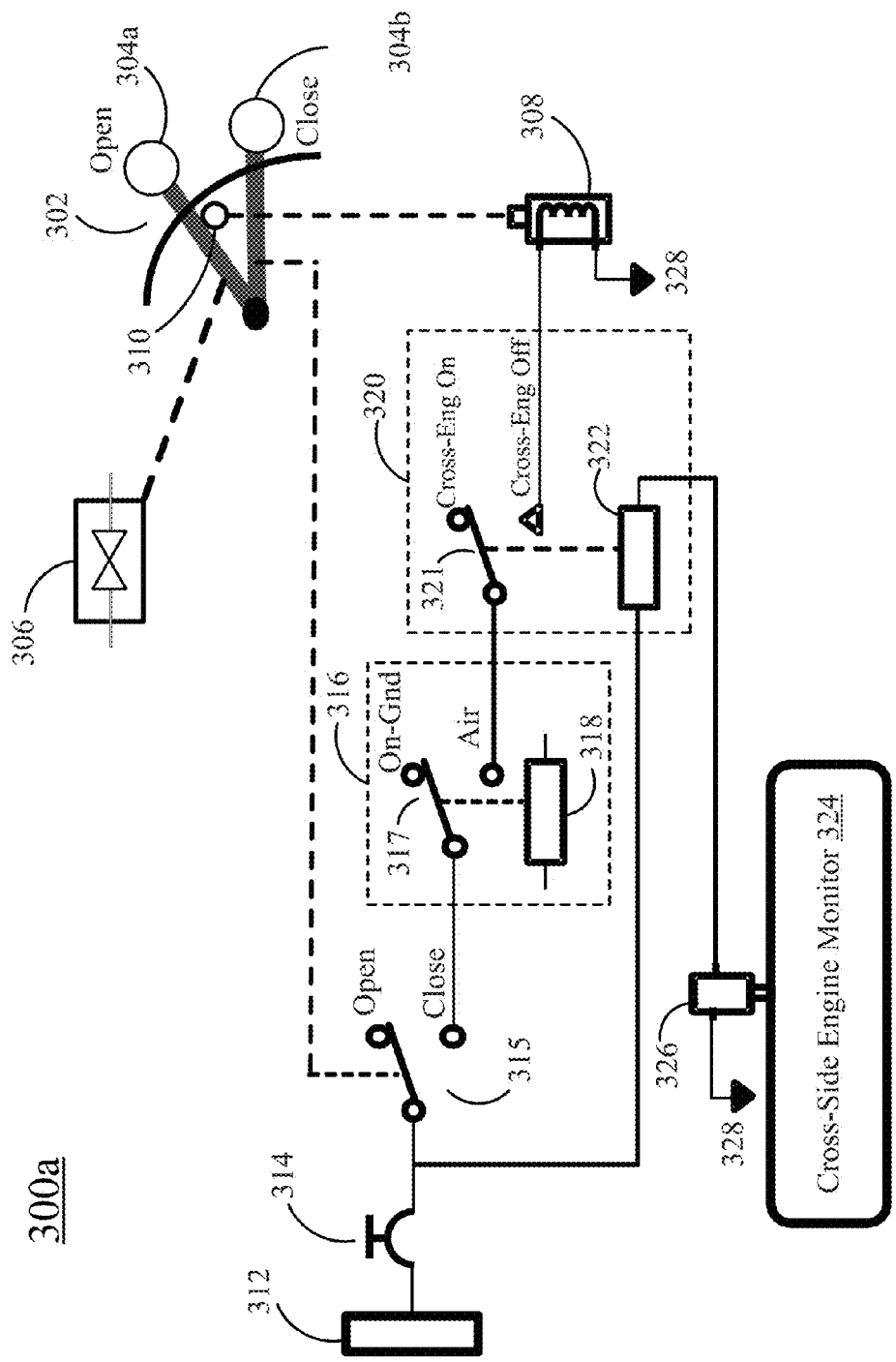
FIG. 3A shows a schematic of an embodiment of a system for implementing the method of FIG. 2 in an aircraft utilizing a mechanical lever to control a fuel shutoff valve.

FIG. 3A shows a schematic of an embodiment of a system 300a for implementing the method 200 of FIG. 2 in an aircraft utilizing a mechanical lever to control a fuel shutoff valve. The system 300a includes at least a lever 302, an open position 304a, a closed position 304b, a fuel shutoff valve 306, an interlock solenoid 308, an armature 310, a power source 312, a circuit breaker 314, a switch 315, a WOW relay 316, a contact 317, a coil 318, a relay 320, a contact 321, a coil 322, a cross-side engine monitor 324, a switch 326, and ground 328. In other embodiments, the system 300a may not include all of the components listed and/or may include other components in addition to or instead of those listed above.

FIG. 3A shows an embodiment of a system 300a that controls whether to allow a mechanical lever to open and close a fuel shutoff valve. In at least one embodiment, the system 300a receives signals from cross-side engine monitor and/or WOW sensor and determines whether to allow or prevent the mechanical lever from shutting off the fuel to the on-side engine.

Lever 302 is a mechanical lever that may be manually operated to control the fuel to an engine. In at least one embodiment, the lever 302 is a throttle lever, a thrust lever, or a power lever that may be located in the cockpit of an aircraft, and may be used by the pilot and/or copilot. Throughout this specification, the terms "lever," "mechanical lever," "thrust lever," "throttle lever," and "power lever" are used interchangeably, and may be substituted one for another to obtain different embodiments. In at least one embodiment, the lever 302 is mechanically connected to a fuel shutoff valve and opens and closes the fuel shutoff valve. In an embodiment, the connection between the lever 302 and the fuel shutoff valve may be based on OEM design and/or may include any combination of connecting rods, cables, bell cranks, for example.

In at least one embodiment, a multi-engine aircraft may include multiple levers, each controlling the fuel to an individual engine. In an embodiment, the lever(s) may be found in the aircraft's center console (or on the dashboard of smaller aircraft). In an embodiment, the lever 302 may be mechanically linked to a fuel shutoff valve to open and close the fuel shutoff valve.

Open position 304a is a position in which when the lever 302 stays the fuel shutoff valve is open, allowing fuel to be pumped to the engine. In at least one embodiment, the pilot may manually move the lever 302 to the open position 304a to turn on the corresponding engine.

Closed position 304b is a position in which when the lever 302 stays the fuel shutoff valve is closed and thereby shuts off the fuel to the engine. In at least one embodiment, the lever 302 may be prevented, by controlling the fuel shutoff interlock system, from moving to the closed position 304b in certain conditions (e.g., when the aircraft is in the air and the cross-side engine is off, or when the cross-side engine does not provide sufficient takeoff power), so as to improve the safety of the aircraft.

Fuel shutoff valve 306 is a valve that is configured to control the fuel that is pumped to an engine. In an embodiment, the fuel shutoff valve 306 can be opened and closed to allow and stop the fuel being pumped to the engine, respectively. In an embodiment, the fuel shutoff valve 306 is mechanically controlled by the lever 302.

Interlock solenoid 308 is a solenoid that, when actuated (e.g., by an electrical current), causes a mechanical lockout mechanism to lock the lever 302 in the open position 304a, and thus preventing the pilot from moving the lever 302 to the closed position 304b and from closing the fuel shutoff valve 306. In an embodiment, when the interlock solenoid 308 is not actuated, the pilot may close the fuel shutoff valve 306. In an embodiment, the interlock solenoid 308 includes coils that form an electromagnet that converts electric energy to change the position of an armature.

Armature 310 is a movable metal piece (e.g., a steel or iron rod or slug) that, when activated by the interlock solenoid 308 moves out of the solenoid and thereby locks the lever 302 in the open position 304a, and thereby prevents the pilot from inadvertently shutting off the fuel to the on-side engine. In an embodiment, when the interlock solenoid 308 is inactive, the armature 310 is biased to stay retracted, allowing the pilot to move the lever 302 to the closed position 304b and shut off the engine. The mechanical lockout mechanism using the interlock solenoid 308 and armature 310 will be further discussed in FIGS. 3B-3D.

Power source 312 provides electric power as an input into the system 300a. In an embodiment, the power source 312 is the essential bus power, which was discussed in conjunction with FIG. 2. In an embodiment, the power source 312 provides direct current (DC) power.

Circuit breaker 314 is a circuit breaker system that connects and disconnects the power line from the power source 312 to the elements in the system 300a. In an embodiment, when the circuit breaker 314 is tripped, the interlock solenoid 308 is deactivated, which disables the shutoff interlock mechanism and allows the pilot to move the lever 302 to control the engine. In an embodiment, the circuit breaker 314 serves as a switch (or may be replaced by a switch) that allows the pilot to disable the fuel shutoff interlock (by cutting off the power to the circuit), so that the pilot may manually control the engine(s).

Switch 315 may be an electrical switch, mechanical switch, or electro mechanical switch that is controlled by the lever 302. When the lever 302 is in the open position 304a, allowing fuel to flow into the engine, the switch 315 is closed, thereby enabling the safety mechanism so as to hinder turning off the fuel at inappropriate moments. When the lever 302 is in the closed position 304b, thereby shutting off the engine, the switch 315 is open, and thus breaks the circuit and causes the solenoid 308 to be deactivated and the safety mechanism is disabled so that the safety mechanism does not hinder turning the engine back on. For example, when the lever 302 is in the closed position, the solenoid 308 is deactivated and the armature 310 is retracted, and thus allows the pilot/copilot to turn the engine back on.

Weight-On-Wheels (WOW) relay 316 is a switch that connects and disconnects the circuit based on the signals from the WOW sensor 102. In an embodiment, when the WOW sensor 102 detects whether the aircraft is on the ground (e.g., when the landing gear struts are compressed beyond a particular threshold), the signal may cause the WOW relay 316 to connect to a terminal (e.g., "On-Gnd" terminal as shown in FIG. 3A, indicating the aircraft is on the ground), which disconnects the interlock solenoid 308 from the power source 312. Since the interlock solenoid 308 has no power, interlock solenoid 308 is not energized, which allows the pilot to move the lever 302 to shut off the engine. In another embodiment, when the WOW sensor 102 detects whether the aircraft is in the air (e.g., when the landing gear struts are not compress beyond the threshold), the signal may cause the WOW relay 316 to connect to the other terminal (e.g., "Air" terminal as shown in FIG. 3A, indicating the aircraft is in the air), and whether the interlock solenoid is actuated is determined by the relay that is controlled based on the status of the cross-side engine.

Contact 317 is the contact of the WOW relay 316, which may be connected to the "On-Gnd" terminal (e.g., when the aircraft is on the ground) or an "Air" terminal (e.g., when the aircraft is in the air).

Coil 318 may include one or more coils of the WOW relay 316. In an embodiment, a signal received from the WOW sensor 102 may energize the coil 318, causing a change of status of the WOW relay 316.

Relay 320 is a switch that is controlled based on the status of the cross-side engine. In an embodiment, when the cross-side engine monitor detects that the cross-side engine is off (or does not have sufficient takeoff power), the relay 320 connects to a terminal (e.g., "Cross-Eng Off" terminal as shown in FIG. 3A, indicating the cross-side engine is off or does not have enough takeoff power). When the cross-side engine monitor detects a signal indicating that the cross-side engine is off (or does not have sufficient takeoff power), the signal may cause the relay 320 to connect to the other terminal (e.g., "Cross-Eng Off" terminal as shown in FIG. 3A, indicating the cross-side engine is off). In at least one embodiment, when the aircraft is in the air (e.g., when the WOW relay 316 connects to the "Air" terminal) and the cross-side engine is off (e.g., the relay 320 connects to the "Cross-Eng Off" terminal), the interlock solenoid 308 is energized and causes the armature 310 to lock the lever 302 in the open position 304a, preventing shutoff of the engine. When the aircraft is in the air (e.g., when the WOW relay 316 connects to the "Air" terminal) and the cross-side engine is on (e.g., the relay 320 connects to the "Cross-Eng On" terminal), the interlock solenoid 308 is not actuated, which thereby allows the pilot to move the lever 302 to shut off the engine.

Contact 321 is the contact of the WOW relay 320, which may be connected to a "Cross-Eng On" terminal or a "Cross-Eng Off" terminal.

Coil 322 may include one or more coils of the relay 320. In an embodiment, a signal from the cross-side engine monitor may cause the coil 322 to be energized and changes the status of the relay 320.

Cross-side engine monitor 324 may be an embodiment of the cross-side engine monitor 104, which was discussed in conjunction with FIG. 1. Switch 326 is an electrical switch that controls whether the electric current passes the coils 322 of the relay 320 to ground. In an embodiment, the cross-side engine monitor 324 is a pressure sensor that monitors the air pressure of the engine, and accordingly controls the switch 326, which may be a pressure switch. The pressure sensor may open and close the pressure switch, depending on the detected pressure of the engine, to control the status of the relay 320. For example, when the pressure sensor detects that the pressure meets or exceeds a pressure threshold (e.g., when the cross-side engine is on and/or have sufficient power), the switch contacts of the pressure switch is closed and thereby complete the circuit to energize the coil 322, causing the relay 320 to connect to the "Cross-Eng On" terminal.

Ground 328 provides a return path for electric current from the safety control system (e.g., form switch 308 and 326) to the power source.

Figure 3B:
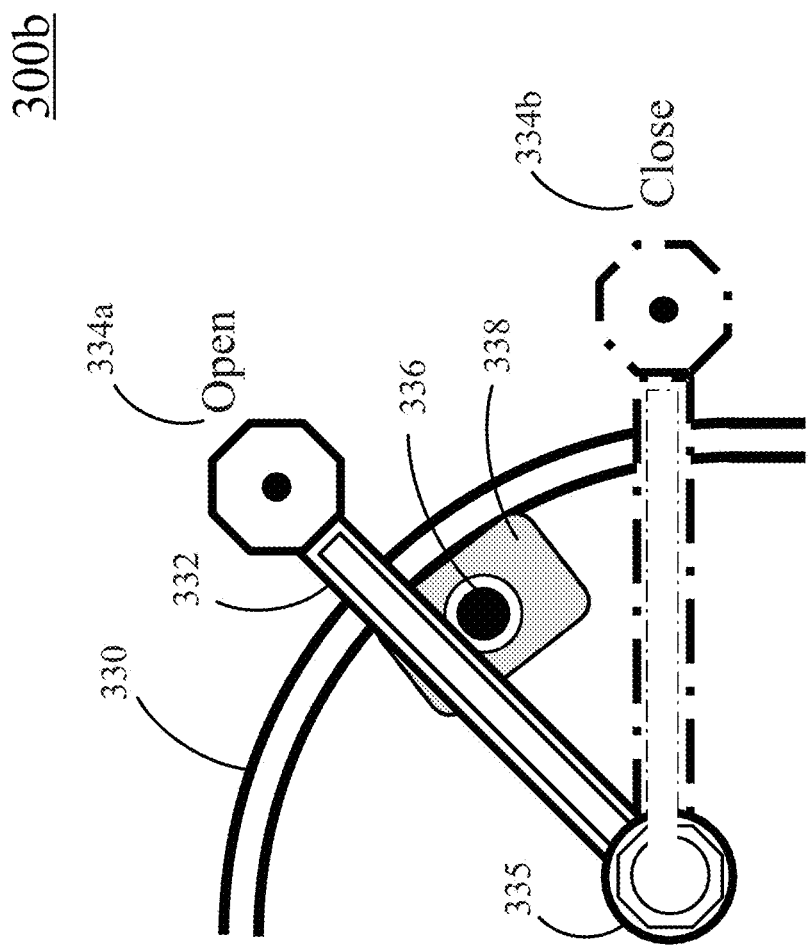
FIG. 3B shows a side view of an embodiment of a mechanical lockout mechanism that may be used in FIG. 3A.

FIG. 3B shows a side view of an embodiment of a mechanical lockout mechanism 300b that may be used in FIG. 3A. The mechanical lockout mechanism 300b includes at least a chassis 330, a lever 332, an axis 335, an open position 334a, a closed position 334b, an armature 336, and an interlock solenoid 338. In other embodiments, the mechanical lockout mechanism 300b may not include all of the components listed and/or may include other components in addition to or instead of those listed above.

FIG. 3B shows a side view of an embodiment of a mechanical lockout mechanism 300b that may be used in the system 300a in FIG. 3A to control whether to allow the mechanical lever 302 to close the fuel shutoff valve 306.

Chassis 330 is a portion of a chassis of the cockpit, center console, or dashboard of an aircraft, in which the lever (and/or other flight instruments) is located.

Lever 332, open position 334a, and closed position 334b may be embodiments of the lever 302, the open position 304a, and the closed position 304b, which were discussed in conjunction with FIG. 3A. In at least one embodiment, the lever 332 may be manually moved to the open position 334a, causing the fuel shutoff valve 306 to open and thereby providing fuel to the corresponding engine. While the lever 332 is moved to the closed position 334b, the fuel shutoff valve 306 is closed, shutting off the fuel to the engine.

Axis 335 is the axis about which the lever 332 may rotate to the open position 334a or the closed position 334b.

Armature 336 and interlock solenoid 338 may be embodiments of the armature 310 and interlock solenoid 308, which were discussed in conjunction with FIG. 3A. In an embodiment, the interlock solenoid 338 may be energized and thereby move the armature 336 outward to lock the lever 332 in the open position 334a. In an embodiment, the interlock solenoid 338 and armature 336 may be manually moved away from the lever 332, so as not to block the lever 332 (thereby manually overriding lockout system 300b).

Figure 3C:
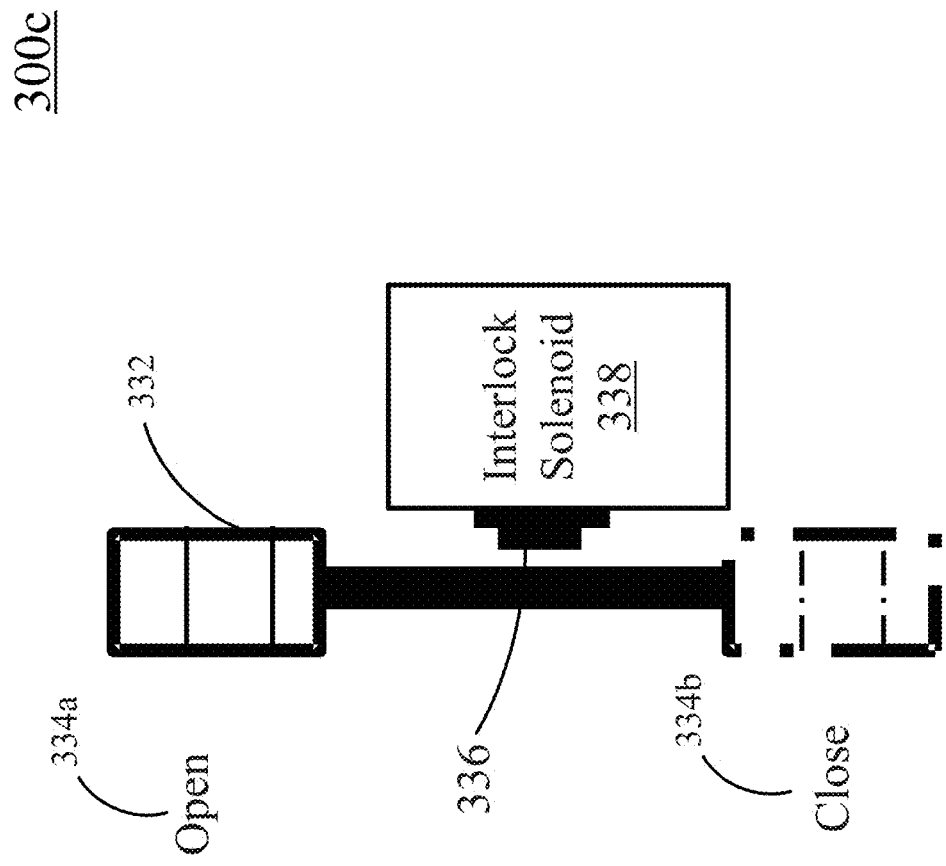
FIG. 3C shows a front view of an embodiment of the mechanical lockout mechanism of FIG. 3B when the solenoid is inactive.

FIG. 3C shows a front view 300c of an embodiment of the mechanical lockout mechanism 300b of FIG. 3B when the interlock solenoid 338 is inactive. The front view 300c shows at least the lever 332, the open position 334a, the closed position 334b, the armature 336, and the interlock solenoid 338, which were discussed in conjunction with FIG. 3B. In other embodiments, the system 300c may not include all of the components listed and/or may include other components in addition to or instead of those listed above.

FIG. 3C shows that when the interlock solenoid 338 is not actuated, the armature 336 is biased to stay retracted in the solenoid 338, allowing the pilot to move the lever 332 to the closed position 334b and shut off the fuel.

Figure 3D:
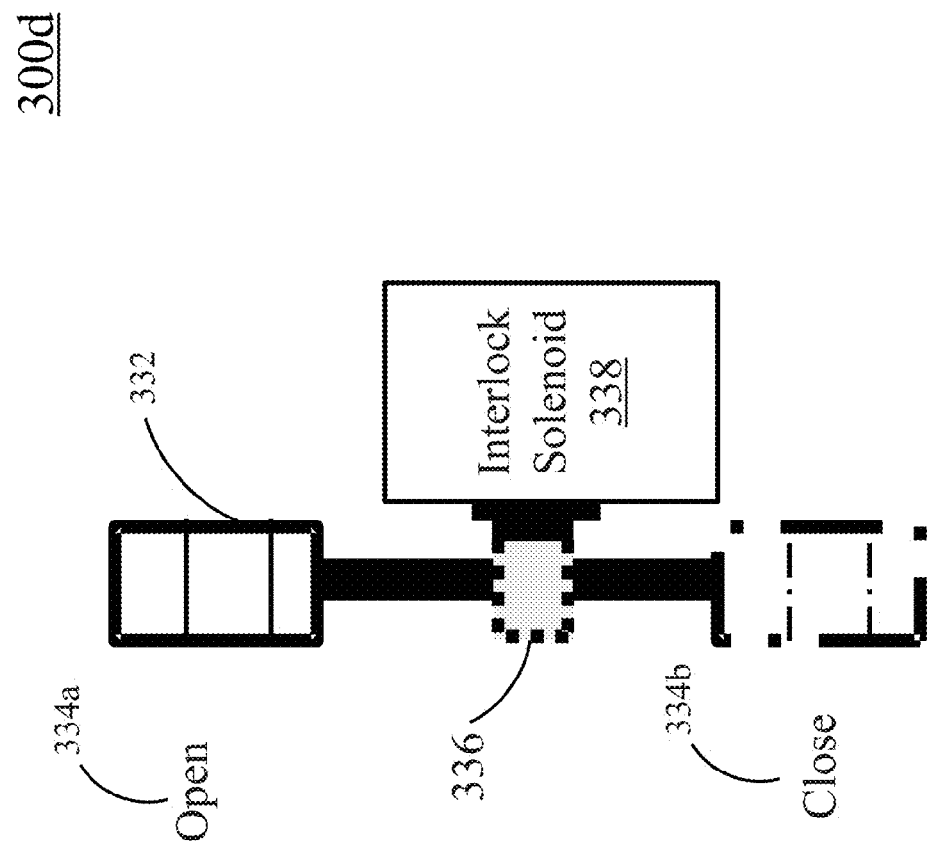
FIG. 3D shows a front view of an embodiment of the mechanical lockout mechanism of FIG. 3B when the solenoid is energized.

FIG. 3D shows a front view 300d of an embodiment of the mechanical lockout mechanism 300b of FIG. 3B when the interlock solenoid 338 is energized. The front view 300d shows at least the lever 332, the open position 334a, the closed position 334b, the armature 336, and the interlock solenoid 338, which were discussed in conjunction with FIG. 3B. In other embodiments, the system 300d may not include all of the components listed and/or may include other components in addition to or instead of those listed above.

FIG. 3D shows that when the interlock solenoid 338 is energized, the armature 336 extends out of the solenoid 338 and thereby blocks the lever 332, preventing the pilot from shutting off the fuel.

Figure 4:
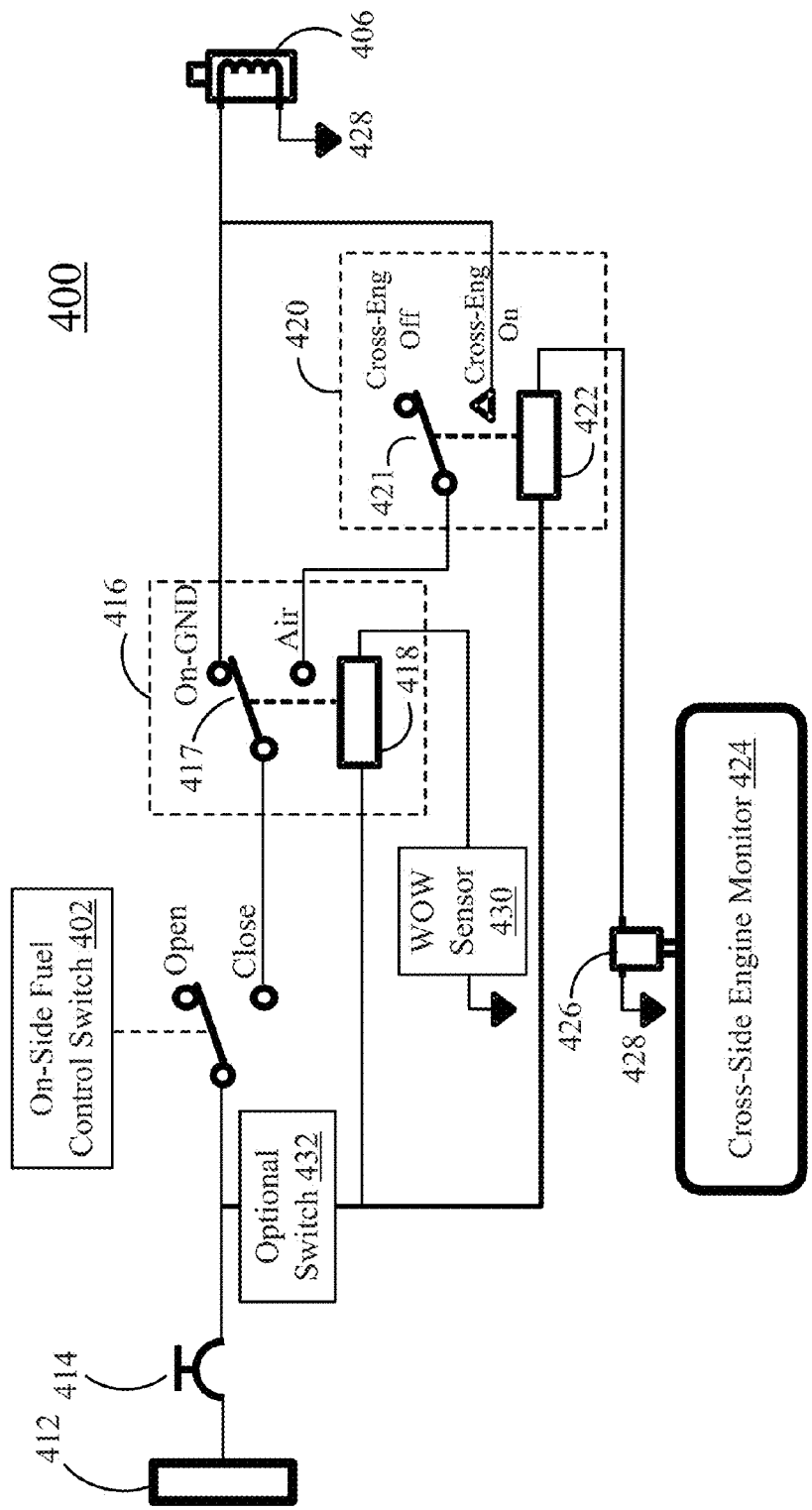
FIG. 4 shows a schematic of an embodiment of a system for implementing the method of FIG. 2 in an aircraft utilizing electrical power to control a fuel shutoff valve.

FIG. 4 shows a schematic of an embodiment of a system 400 for implementing the method of FIG. 2 in an aircraft utilizing electrical power to control a fuel shutoff valve. The system 400 includes at least an on-side fuel control switch 402, an on-side fuel solenoid 406, a power source 412, a circuit breaker 414, a WOW relay 416, a contact 417, a coil 418, a relay 420, a contact 421, a coil 422, a cross-side engine monitor 424, a switch 426, ground 428, WOW sensor 430, and optional switch 432. In other embodiments, the system 400 may not include all of the components listed and/or may include other components in addition to or instead of those listed above.

FIG. 4 shows an embodiment of a system 400 that controls whether to allow an electrical control switch to shut off the fuel to the engine based on signals from the cross-side engine monitor and/or the WOW sensor. Power source 412, circuit breaker 414, WOW relay 416, contact 417, coil 418, relay 420, contact 421, coil 422, cross-side engine monitor 424, switch 426, and ground 428 may be embodiments of the power source 312, circuit breaker 314, WOW relay 316, contact 317, coil 318, relay 320, contact 321, coil 322, cross-side engine monitor 324, switch 326, and ground 328, which were discussed in conjunction with FIG. 3A.

On-side fuel control switch 402 is an electrical switch that, when actuated by electric current, controls the connection of the circuit. In an embodiment, when the on-side fuel control switch 402 is opened (e.g., by connecting the switch 402 to the "Open" terminal), the circuit is open and thus the on-side fuel solenoid is inactive, causing the fuel valve to be opened, so that the fuel to be pumped to the on-side engine. When the pilot closes the on-side fuel control switch 402 (e.g., by connecting the switch 402 to the "Close" terminal) and the WOW relay 416 is connected to the "On-Gnd" terminal (indicating the aircraft is on the ground), the on-side fuel solenoid is energized, causing the fuel to be shut off (e.g., by closing a fuel shutoff valve such as the fuel shutoff valve 406). When the on-side fuel control switch 402 is closed and the WOW relay 416 is connected to the "Air" terminal (indicating the aircraft is in the air), then whether the on-side engine can be turned off depends on the status of the cross-side engine. For example, if the relay 420 connects to the "Cross-Eng On" terminal (indicating that the cross-side engine is on) when the aircraft is in the air, turning the switch 402 to the closed position causes the on-side fuel solenoid to be energized, thus causing the fuel to be shut off. If the relay 420 is connected to the "Cross-Eng Off" terminal (indicating that the cross-side engine is off) when the aircraft is in the air, the on-side fuel solenoid is not energized, and the fuel is not shut off. In an embodiment, when the circuit breaker 414 is tripped, the on-side fuel solenoid is inactivated and thus the fuel is not shut off.

On-side fuel solenoid 406 is a solenoid that, when energized shuts off the on-side engine. In at least one embodiment, the on-side fuel solenoid 406, when energized, closes the fuel shutoff value and thereby shuts off the fuel to the on-side engine.

WOW sensor 430 detects when there is no weight on the wheels of the airplane, and energizes the WOW relay 416 to be in the Air position when there is no weight on the wheels. WOW sensor 430 may be an embodiment of the WOW sensor 102 that was discussed in conjunction with FIG. 1. Optional switch 432 may be added in series with coil 422 and coil 418, and in parallel with the on-side fuel control switch 402, which may be used to disable the safety circuit (relays 416 and 420), returning complete control over the fuel to the switch 402.

In at least one embodiment, a multi-engine aircraft may include multiple fuel control switches, each controlling the fuel to an individual engine. In an embodiment, the fuel control switches may be located in the aircraft's center console or on the dashboard of smaller aircraft. In an embodiment, the fuel control switches may each control a fuel solenoid that controls a fuel shutoff valve.

Figure 5:
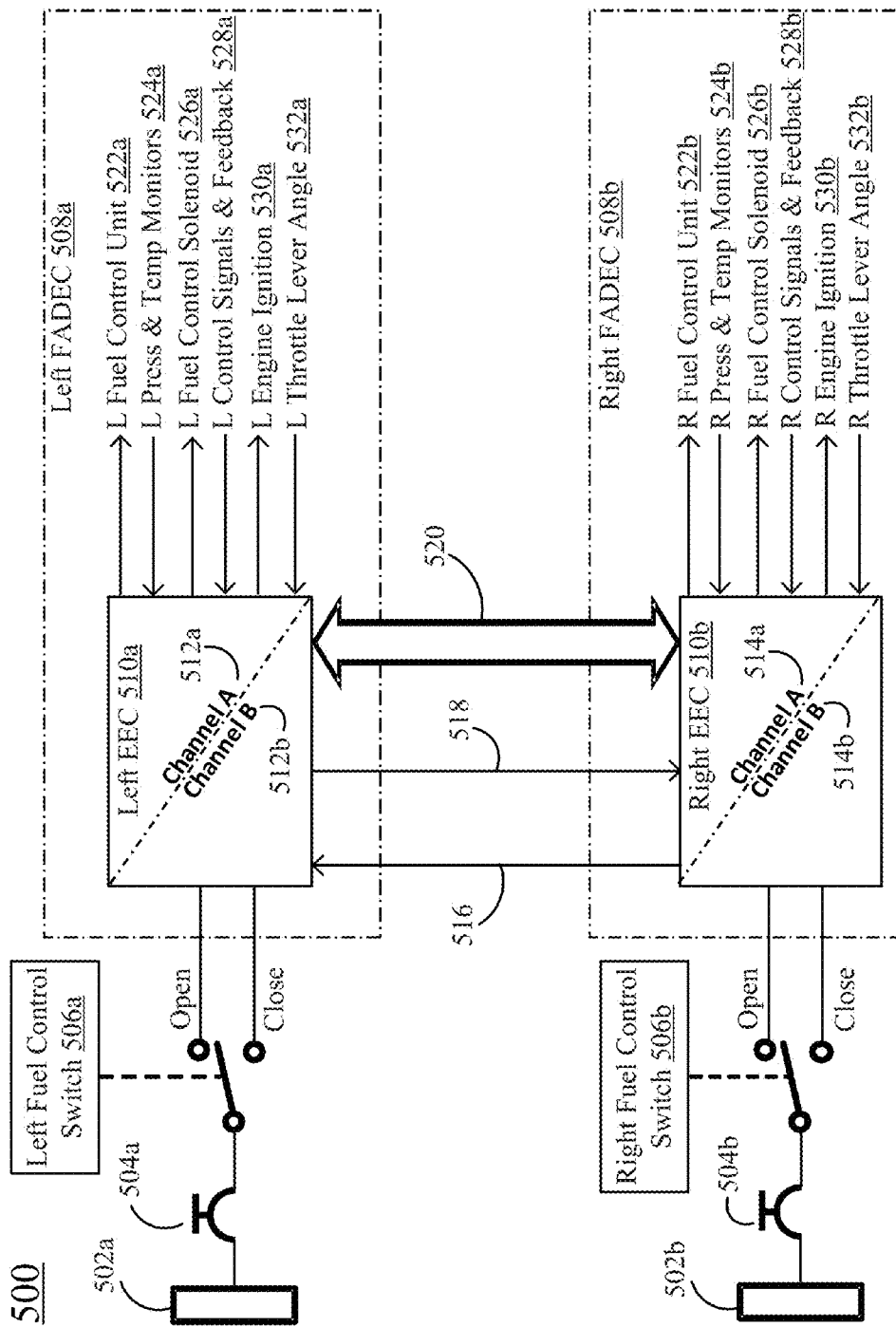
FIG. 5 shows a schematic of an embodiment of a system for implementing the method of FIG. 2 in an aircraft utilizing a digital control system to control a fuel shutoff valve.

FIG. 5 shows a schematic of an embodiment of a system 500 for implementing the method of FIG. 2 in an aircraft utilizing a digital control system to control a fuel shutoff valve. The system 500 includes at least a left power source 502a, a right power source 502b, a left circuit breaker 504a, a right circuit breaker 504b, a left fuel control switch 506a, a right fuel control switch 506b, a left relay 507a, a right relay 507b, a left Fully Automated Digital Engine Control (FADEC) 508a, a right FADEC 508b, a left Electronic Engine Control (EEC) 510a, a right EEC 510b, a left channel A 512a, a left channel B 512b, a right channel A 514a, a right channel B 514b, right engine signals 516, left engine signals 518, a data bus 520, a left fuel control unit 522a, a right fuel control unit 522b, left pressure and temperature monitors 524a, right pressure and temperature monitors 524a, a left fuel control solenoid 526a, a right fuel control solenoid 526b, left control signals and feedback 528a, right control signals and feedback 528b, left engine ignition 530a, right engine ignition 530b, left throttle lever angle 532a, and right throttle lever angle 532b. In other embodiments, the system 500 may not include all of the components listed and/or may include other components in addition to or instead of those listed above.

FIG. 5 shows an embodiment of a system 500 that utilizes electronics (e.g., FADEC) via circuit breakers and electrical fuel control switches to provide input signals to the FADEC. In at least one embodiment, the engines (e.g., a left engine and a right engine of the aircraft) are individually controlled by Fully Automated Digital Engine Control (FADEC) based on digital signals received from various monitor devices and/or logic.

Left power source 502a and right power source 502b may be embodiments of the power source 312 or 412, which were discussed in conjunction with FIGS. 3A and 4. In at least one embodiment, the left power source 502a provides electric power to the system that controls the left engine, while the right power source 502b provides electric power to the system that controls the right engine. In an embodiment, the left power source 502a and right power source 502b are both from the essential bus power of the aircraft.

Left circuit breaker 504a and right circuit breaker 504b may be embodiments of the circuit breaker 314 or 414, which were discussed in conjunction with FIGS. 3A and 4. In an embodiment, disconnecting the left circuit breaker 504a and right circuit breaker 504b disables the digital control system using the shutoff interlock in FIG. 5 of the left engine and the right engine, respectively.

Left fuel control switch 506a and right fuel control switch 506b may be embodiments of the fuel control switch 402, which was discussed in conjunction with FIG. 4. In at least one embodiment, the left fuel control switch 506a controls the fuel to the left engine via the left FADEC, while the right fuel control switch 506b controls the fuel to the right engine via the right FADEC.

Left Fully Automated Digital Engine Control (FADEC) 508a and right FADEC 508b are control systems that utilize internal software (e.g., firmware) to digitally and electronically control the left engine and the right engine, respectively. In at least one embodiment, the internal software of the FADECs includes instructions, which when implemented causes the system 500 to prevent inadvertent engine shut-down. In an embodiment, the left FADEC controls the left engine based on signals received from the monitor devices that monitor the left engine and/or signals that indicate the status of the right engine, while the right FADEC controls the right engine based on signals received from the monitor devices that monitor the right engine and/or signals that indicate the status of the left engine. In at least one embodiment, the FADECs receive signals from the WOW sensors as well as on-side engine parameters used to optimize the on-side engine's performance. In an embodiment, the FADECs receive multiple input signals of the current flight condition including air density, throttle lever position, engine temperatures, engine pressures, and/or many other parameters. In an embodiment, if the on-side FADEC (e.g., the left FADEC 508a) is notified that the cross-side engine (e.g., the right engine) has encountered problems, then the on-side FADEC software can override the pilot inadvertently shutting down the on-side engine (e.g., the left engine), via the on-side fuel control switch 506a signal to the FADEC 508a to control the on-side fuel control solenoid/unit.

Left Electronic Engine Control (EEC) 510a and right EEC 510b include digital computers that process and analyze signals that represent operating parameters of the engines and accordingly generate instructions to control the engines. In at least one embodiment, the internal software of the EECs is configured to accommodate the logic and implement the method described in FIG. 2.

Left channel A 512a and left channel B 512b are digital channels in the left EEC 510a through which signals/instructions may be transferred. In an embodiment, the left channel A 512a and left channel B 512b are separate identical channels that provide redundancy for the signal transmission to improve safety in case one of the channels fails. Right channel A 514a and right channel B 514b are similar to the left channel A 512a and left channel B 512b, except that the right channel A 514a and right channel B 514b are in the right EEC 510b for transmitting signals in the right FADEC 508b.

Right engine signals 516 are signals that indicate the status of the right engine to the left EEC 510a for the left FADEC 508a to control the left engine. For example, the right engine signals 516 may indicate whether the right engine is on or off, or during takeoff the right engine signals 516 may indicate whether the right engine has sufficient power, so that the left EEC 510a may determine whether to allow the left engine to be shutoff.

Left engine signals 518 are signals that indicate the status of the left engine to the right EEC 510b for the right FADEC 508b to control the right engine. For example, the left engine signals 518 may indicate whether the left engine is on or off, or whether the left engine has sufficient takeoff power during takeoff, so that the right EEC 510b may determine whether to allow shutting off of the right engine.

Data bus 520 is a data bus that communicatively connects the FADECs (e.g., between the left FADEC 508a and right FADEC 508b). In an embodiment, the data bus 520 is an ARINC 429 bus that uses a digital information transfer system for carrying data within the airplane's network. Any data bus may be substituted for the ARIC 429 bus. In an embodiment, FADECs may have spare ARINC 429 bus ports to which the fuel shutoff interlock may be connected. The data bus 520 may be used to transmit status information of the right engine to the left FADEC 508a, and/or to transmit status information of the left engine to the right FADEC 508b. Alternatively, discrete signals from one FADEC to another FADEC may be provided, such as the right engine signals 516 and left engine signals 518.

Left fuel control unit 522a and right fuel control unit 522b include fuel control units (e.g., fuel shutoff valves) that control the fuel to the left engine and right engine, respectively. In an embodiment, the left fuel control unit 522a and right fuel control unit 522b receive instructions from the left EEC 510a and right EEC 510b, respectively, to control the corresponding engine.

Left pressure and temperature monitors 524a and right pressure and temperature monitors 524a monitor pressure and temperature of the left engine and right engine, respectively, and transfer the data to the left EEC 510a and right EEC 510b.

Left fuel control solenoid 526a and right fuel control solenoid 526b are solenoids that, when energized, controls the left fuel shutoff valve and right fuel shutoff valve, respectively. In an embodiment, the left EEC 510a and right EEC 510b controls the status of the left fuel control solenoid 526a and right fuel control solenoid 526b, respectively. In an embodiment, the left EEC 510a and the right EEC 510b may control the status of the left fuel control solenoid 526a and right fuel control solenoid 526b, respectively.

Left control signals and feedback 528a and right control signals and feedback 528b may include control signals and feedback signals sent by monitors that indicate the status of the left engine and right engine to the left EEC 510*a* and right EEC 510*b*, respectively.

Left engine ignition 530*a* and right engine ignition 530*b* include ignition systems that are used to start the left engine and the right engine, respectively. In an embodiment, the left EEC 510*a* and the right EEC 510*b* may send signals to the left engine ignition 530*a* and right engine ignition 530*b* to start the left engine and right engine, respectively.

Left Throttle Lever Angle (TLA) 532*a* and right Throttle Lever Angle (TLA) 532*b* refer to the current angle of the left throttle lever and the right throttle lever, indicating the position of the levers. In an embodiment, the greater the TLA, the greater the engine thrust.

In at least one embodiment, a multi-engine aircraft may include multiple FADECs, each controlling an individual engine. In an embodiment, each FADEC may monitor and control the corresponding engine, receive signals from other FADECs including status information of other engines.

Figure 6:
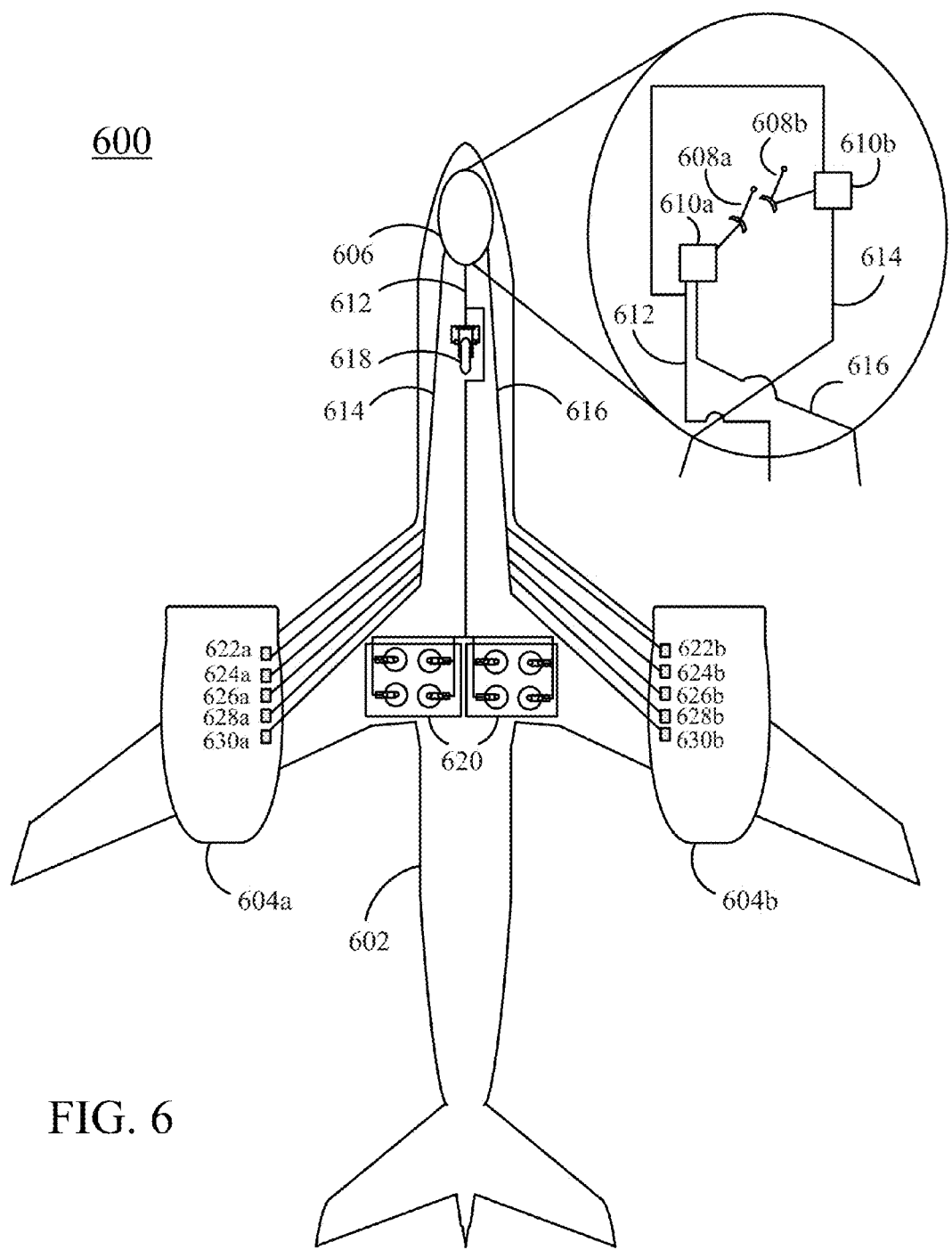
FIG. 6 shows a schematic representation of an embodiment of an airplane that includes a fuel safety control system.

FIG. 6 shows a bottom view of an embodiment of an airplane 600 that includes a fuel safety control system. Airplane 600 includes at least a body 602, a left engine 604*a*, a right engine 604*b*, an engine control system 606, a left lever 608*a*, a right lever 608*b*, a left interlock 610*a*, a right interlock 610*b*, WOW signals 612, left engine signals 614, right engine signals 616, front landing gears 618, back landing gears 620, left engine RPM 622*a*, right engine RPM 622*b*, left engine EPR 624*a*, right engine EPR 624*b*, left torque 626*a*, right torque 626*b*, left engine oil pressure 628*a*, right engine oil pressure 628*b*, left FADEC signals 630*a*, right FADEC signals 630*b*. In other embodiments, the airplane 600 may not include all of the components listed and/or may include other components in addition to or instead of those listed above.

FIG. 6 shows an embodiment of an airplane 600 that has two engines, each controlled by a fuel safety control system that controls a mechanical lever. In other embodiments, an aircraft may include multiple engines, each individually controlled by a fuel safety control system.

Body 602 is the body of the airplane 600. FIG. 6 shows a view of the side of the body 602 that faces the ground when the airplane 600 is on the ground. The body includes a head and a tail. In at least one embodiment, wings extend either side of the body 602. The number and shape of the wings varies depending on different types of airplanes. Main controls of the airplane 600 are located at the head of the body 602, allowing the pilot to control and direct the aircraft via control system that may include, but not limited to, cockpit instruments, control yokes, pedals, levers, buttons, for example.

Left engine 604*a* and right engine 604*b* are aircraft engines on the left side and right side, respectively (viewing from the bottom of the aircraft in FIG. 6). Although two engines are shown in FIG. 6, the airplane 600 may include other numbers of engines. In an embodiment, the left engine 604*a* and right engine 604*b* may be propeller engines, jet engines, turbine engines, piston engine, electric engines, or other types of engines.

Engine control system 606 is a system that is configured to control the engines of the airplane 600 (e.g., by controlling the fuel provided to the left engine 604*a* and right engine 604*b* in FIG. 6), based on signals received from WOW sensors and/or engine monitors. The engine control system 606 may be included in the main control of the airplane 600. In an embodiment, the engine control system 606 may include the systems 300*a*, 400, or 500 as discussed in conjunction with FIGS. 3A, 4, and 5. As an example, FIG. 6 demonstrates the engine control system 606 using mechanical levers in a similar manner as the system 300*a* of FIG. 3A.

Left lever 608*a* and right lever 608*b* may be an embodiment of either of the levers 302 and 322, which were discussed in conjunction with FIGS. 3A and 3B. The left lever 608*a* and right lever 608*b* mechanically control the fuel shutoff valves to the left engine 604*a* and right engine 604*b*, respectively.

Left interlock 610*a* and right interlock 610*b* include safety control systems that controls the left lever 608*a* and right lever 608*b*. Left interlock 610*a* and right interlock 610*b* may be embodiments of the system 300*a* as discussed in conjunction with FIG. 3A. For example, the left interlock 610*a* may prevent/hinder the pilot from closing the left lever 608*a* and shutting off the left engine 604*a* when it is considered unsafe (e.g., when the airplane 600 is in the air and the right engine 604*b* is off, or in the takeoff mode when the right engine 604*b* does not have sufficient power). Vice versa for the right interlock 610*b*.

WOW signals 612 may be signals sent by the WOW sensor 102, which indicate whether the aircraft is on the ground or in the air (or in a takeoff mode).

Left engine signals 614 and right engine signals 616 may include signals that indicate the status and/or performance of the left engine 604*a* and right engine 604*b*, respectively.

Front landing gears 618 and back landing gears 620 may include a set of wheels, skids, or floats that support the airplane 600 while the airplane 600 is on the surface (e.g., on the ground, or for the seaplanes on the water surface). In an embodiment, the front landing gears 618 and back landing gears 620 may retract during flight to reduce drag.

Left engine RPM 622*a* and right engine RPM 622*b* indicate the angular velocity of the turbine of the compressors of the left engine 604*a* and right engine 604*b*, respectively. Alternatively or additionally, for piston powered aircraft, left engine RPM 622*a* and right engine RPM 622*b* may indicate the angular velocity of the crankshaft of the left engine 604*a* and the right engine 604*b*, respectively. In at least one embodiment, left engine RPM 622*a* and right engine RPM 622*b* may be measured in the number of revolutions per unit of time, such as Revolutions Per Minute (RPM).

Left engine EPR 624*a* and right engine EPR 624*b* indicate the Engine Pressure Ratio (EPR) of the left engine 604*a* and the right engine 604*b*, respectively.

Left torque 626*a* and right torque 626*b* indicate the torque applied to turn the engine shaft or the compressor shaft of the left engine 604*a* and the right engine 604*b*, respectively.

Left engine oil pressure 628*a* and right engine oil pressure 628*b* indicate the oil pressure of the left engine 604*a* and the right engine 604*b*, respectively.

Left FADEC signals 630*a* and right FADEC signals 630*b* may be signals from the FADECs that control the left engine 604*a* and right engine 604*b*. In an embodiment, left FADEC signals 630*a* and right FADEC signals 630*b* may be signals sent by the left FADEC 508*a* and right FADEC 508*b*, respectively, which were discussed in conjunction with FIG. 5.

Alternatives and Extensions

Although FIGS. 3A-5 show examples of three types of fuel control systems for implementing the method 200 of FIG. 2, the method 200 of FIG. 2 is not limited to the embodiments of FIGS. 3A-5, but could be implemented in any airplane. Although this specification shows examples of airplanes having fuel-fed engines, the same principles may be applied to completely electric engines. Although the above-mentioned examples deal with airplanes having two engines, the same principles may be applied to an airplane having any number of engines. The flowchart of the method 200 of FIG. 2 may still apply to airplanes with more than two engines except that each decision box is implemented based on input from all engines of the airplane. For example, while in the air, all of the engines are monitored, and a determination is made whether to allow the pilot to shut off an engine, based on whether the airplane can fly safely without that engine (which may depend on how well all of the other engines are functioning and/or how many of the engines need to function well to keep the airplane flying safely). Each fuel shutoff interlock may receive signals from its own monitor that monitors all other engines. Alternatively or additionally, there may be one central monitoring system that monitors the performance of all engines, and uses the input to determine whether to enable or disengage the fuel shutoff interlocks of each engine. In an embodiment, the fuel shutoff interlock can be shut off or disengaged by the pilot in case of unusual situations in which it may be necessary to shut off both or all engines while in flight. However, requiring the pilot to shut off the interlock prior to shutting the engine adds an extra step to shutting off the engine, making it less likely that the pilot will inadvertently shut off all engines and/or inadvertently shut off one engine when enough of the other engines are not performing properly for it to be safe to shut off another engine.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method of inhibiting an operator of an aircraft with a plurality of engines from shutting down an operating engine of the aircraft if it would be unsafe to do so, the method comprising the steps of:
    providing a sensor for automatically determining whether an aircraft is in the air; and
    providing a mechanical or electrical interlock inhibiting an on-board operator of the aircraft from shutting off an operating engine of the aircraft if the aircraft is in the air and the engine or engines other than the operating engine are malfunctioning or non-functional.

2. The method of claim 1, further comprising the steps of:
    automatically determining whether the aircraft is in a takeoff mode;
    automatically determining one or more performance parameters of the engines of the aircraft;
    automatically determining whether the engine or engines other than the operating engine collectively provide enough power for taking off based on the one or more performance parameters; and
    inhibiting an on-board operator of the aircraft from shutting off the operating engine if the other engine or engines do not collectively provide enough power for taking off.

3. The method of claim 2, wherein the one or more performance parameters includes an angular velocity of a turbine or a crankshaft of at least one of the other one or more engines.

4. The method of claim 2, wherein the one or more performance parameters includes an engine pressure ratio of at least one of the other one or more engines.

5. The method of claim 2, wherein the one or more performance parameters a torque applied to turn a shaft of at least one of the other one or more engines.

6. The method of claim 2, wherein the one or more performance parameters an oil pressure of at least one of the other one or more engines.

7. The method of claim 2, further comprising the step of automatically determining Fully Automated Digital Engine Control (FADEC) signals of at least one of the other one or more engines.

8. The method of claim 1, wherein the aircraft includes a lever and a fuel shut-off valve associated with each engine of the aircraft; and
    the step of providing an interlock includes a mechanism for locking the fuel shut-off lever to the operating engine to keep the fuel shutoff valve to the operating engine open.

9. The method of claim 8, wherein the aircraft includes a fuel shut-off switch associated with each engine of the aircraft; and
    the step of providing an interlock includes an electronic circuit for disabling the fuel shut-off switch to the operating engine.

10. The method of claim 8, wherein the aircraft includes a digital control system that automatically controls which engines of the aircraft are ON or OFF; and
    the step of providing an interlock includes an electronic circuit for disconnecting power to the digital control system to keep the operating engine from being turned OFF.

11. The method of claim 1, further comprising the step of automatically determining whether essential bus power is present to the aircraft; and
    if essential bus power is present, disabling the interlock that inhibits an operator of the aircraft from shutting off an operating engine of the aircraft.

12. A system for inhibiting an operator of an aircraft having a plurality of engines from shutting down an operating engine of the aircraft if it would be unsafe to do so, comprising:
    at least one sensor that, when activated, automatically determines whether an aircraft is in the air;
    a fuel shutoff valve associated with each engine, which when opened, allows fuel being provided to an engine, and which, when closed, stops fuel flow to that engine and shutting off that engine; and
    a control system that includes at least one processor for automatically inhibiting the closure of the fuel shutoff valve associated with an operating engine if the aircraft is airborne based on the status of the aircraft's other engines.

13. The system of claim 12, further comprising
    a switch that, when activated, overrides the controlling by the control system the fuel shutoff valve.

14. The system of claim 12,
    wherein the status of the aircraft's other engines is based on one or more performance parameters of the engines.

15. The system of claim 12, the control system further comprising
    at least a digital control system that, when activated, automatically controls the fuel shutoff valve based on digital signals.

16. The system of claim 12, the control system further comprising a lever that is mechanically connected to the fuel shutoff valve, the lever being manually operable to open and close the fuel shutoff valve; and a lock mechanism that, when actuated, locks the lever and prevents the lever from closing the fuel shutoff valve if the status indicates an engine other than the operating engine is malfunctioning or non-functional.

* * * * *